United States Patent
Muthiah et al.

(10) Patent No.: US 11,899,598 B2
(45) Date of Patent: Feb. 13, 2024

(54) DATA STORAGE DEVICE AND METHOD FOR LANE SELECTION BASED ON THERMAL CONDITIONS

(71) Applicant: Western Digital Technologies, Inc., San Jose, CA (US)

(72) Inventors: Ramanathan Muthiah, Bangalore (IN); Yogesh Tayal, Bangalore (IN); Anil Kumar Kolar Narayanappa, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/828,368

(22) Filed: May 31, 2022

(65) Prior Publication Data

US 2023/0385211 A1  Nov. 30, 2023

(51) Int. Cl.
*G06F 13/16* (2006.01)
*G06F 1/08* (2006.01)
*G06F 1/20* (2006.01)

(52) U.S. Cl.
CPC ............ *G06F 13/1694* (2013.01); *G06F 1/08* (2013.01); *G06F 1/206* (2013.01)

(58) Field of Classification Search
CPC ......... G06F 13/1694; G06F 1/08; G06F 1/206
See application file for complete search history.

(56) References Cited

U.S. PATENT DOCUMENTS

| | | | |
|---|---|---|---|
| 10,514,676 B2* | 12/2019 | Qi | G05B 19/404 |
| 11,336,723 B1* | 5/2022 | Muniswamy-Reddy | H04L 69/40 |
| 2015/0324312 A1* | 11/2015 | Jacobson | G06F 13/362 710/104 |
| 2016/0011900 A1* | 1/2016 | Reddy | G06F 9/4408 718/1 |
| 2018/0329759 A1* | 11/2018 | Mendel | H01L 23/367 |
| 2019/0179399 A1* | 6/2019 | Suh | G06F 13/4234 |
| 2019/0179547 A1* | 6/2019 | Szubbocsev | G06F 13/4234 |
| 2022/0050800 A1* | 2/2022 | Kim | G06F 13/4022 |
| 2022/0057827 A1* | 2/2022 | Kwon | G06F 13/1668 |

FOREIGN PATENT DOCUMENTS

JP          6090433 B2 *  3/2017  ............. G01F 1/661

OTHER PUBLICATIONS

English Translation of JP-6090433-B2 (Year: 2017).*

* cited by examiner

*Primary Examiner* — Henry Tsai
*Assistant Examiner* — John B Roche
(74) *Attorney, Agent, or Firm* — Crowell & Moring LLP (57) ABSTRACT

A data storage device and method for lane selection based on thermal conditions are provided. In one embodiment, a data storage device is provided comprising a memory and a controller. The controller is configured to determine that action is needed to control a thermal state of the data storage device; and in response to determining that action is needed to control the thermal state of the data storage device, send a request to a host to reduce a number of lanes the host uses to communicate with the data storage device, wherein reducing the number of lanes reduces an amount of heat generated by the data storage device. Other embodiments are possible, and each of the embodiments can be used alone or together in combination.

18 Claims, 9 Drawing Sheets

DATA STORAGE DEVICE AND METHOD FOR LANE SELECTION BASED ON THERMAL CONDITIONS

BACKGROUND

Many protocols are available under which a host and data storage device can exchange data. These protocols typically involve data transfer on more than one physical lane and in different speed configurations. For example, the Universal Serial Bus (USB) 3.2 GEN 2×2 protocol can support speeds as high as 20 gigabits per second (Gbps) and as low as 12 megabits per second (Mbps) and 1.5 Mbps. 20 Gbps can be achieved using two physical lanes running at a clock frequency of 312.5 megahertz (MHz). In cases where the host is requesting continuous data transfers, the data storage device can heat up to a problematic temperature where data gets corrupted or a particular block becomes unresponsive to different voltage signals and needs to be retired as a bad block, which reduces overall capacity of the memory. Data storage devices can apply proactive measures to attempt to prevent these problems. For example, the data storage device can slow down the operating clock of its controller and memory, so that the temperature can be regulated to the point where data integrity can be maintained. More specifically, reducing the clock frequency throttles an amount of data being processed by the memory, which, in turn, limits the amount of generated heat, so that ambient temperature can be achieved.

If a data storage device does not have a built-in heat/temperature sensor, the data storage device may not be able to perform an accurate analysis regarding when to reduce or increase clock frequency. In such cases, the data storage device can keep track of the number of commands and data input-output operations received for a data transfer. Once the count reaches a defined threshold, the controller and memory clock can be adjusted to run at a lower frequency, which lowers heat generation and controls temperature. After a fixed time interval, the clocks can be increased to run at a higher (e.g., maximum) frequency, and the count is reset.

DETAILED DESCRIPTION

Overview

By way of introduction, the below embodiments relate to a data storage device and method for lane selection based on thermal conditions. In one embodiment, a data storage device is provided comprising a memory and a controller. The controller is configured to determine that action is needed to control a thermal state of the data storage device; and in response to determining that action is needed to control the thermal state of the data storage device, send a request to a host to reduce a number of lanes the host uses to communicate with the data storage device, wherein reducing the number of lanes reduces an amount of heat generated by the data storage device.

In some embodiments, the controller is further configured to determine that action is needed to control the thermal state of the data storage device in response to reading a temperature from a temperature sensor in the data storage device.

In some embodiments, the controller is further configured to determine that action is needed to control the thermal state of the data storage device in response to a number of commands for processing by the data storage device exceeding a threshold.

In some embodiments, the controller is further configured to determine that action is needed to control the thermal state of the data storage device in response to a number of commands for processing by the data storage device over a period of time exceeding a threshold.

In some embodiments, the controller is further configured to reduce a frequency of a clock in the data storage device to reduce an amount of heat generated by the data storage device.

In some embodiments, the controller is further configured to disable a physical layer interface coupled with lane(s) that are no longer used after the number of lanes has been reduced.

In some embodiments, the request is for a reduction of the number of lanes from a maximum number of available lanes.

In some embodiments, the request is sent instead of throttling a backend of the controller.

In some embodiments, the request is a proposal that is optionally acceptable by the host.

In some embodiments, the request is a command that is a requirement for the host.

In some embodiments, the request is sent to the host via a vendor-specific command.

In some embodiments, the memory comprises a three-dimensional memory.

In another embodiment, a method is provided that is performed in a host in communication with a data storage device. The method comprises enumerating the data storage device with a first number of lanes, evaluating a workload to be sent to the data storage device for a thermal impact on the data storage device, and re-enumerating the data storage device with a second, reduced number of lanes to control the thermal impact on the data storage device.

In some embodiments, the first number of lanes comprises a maximum available number of lanes.

In some embodiments, evaluating the workload to be sent to the data storage device comprises determining whether a number of commands in the workload exceeds a threshold.

In some embodiments, evaluating the workload to be sent to the data storage device comprises determining whether a number of commands to be sent to the data storage device over a period of time exceeds a threshold.

In some embodiments, the method further comprises receiving a request from the data storage device to re-enumerate the data storage device.

In some embodiments, the method further comprises determining whether to grant the request.

In some embodiments, the request is received via a vendor-specific command.

In another embodiment, a data storage device comprising a memory, means for determining a need to control a temperature of the data storage device, and means for causing a reduction in a number of lanes a host uses to communicate with the data storage device to control the temperature of the data storage device.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figures 1A, 1B:
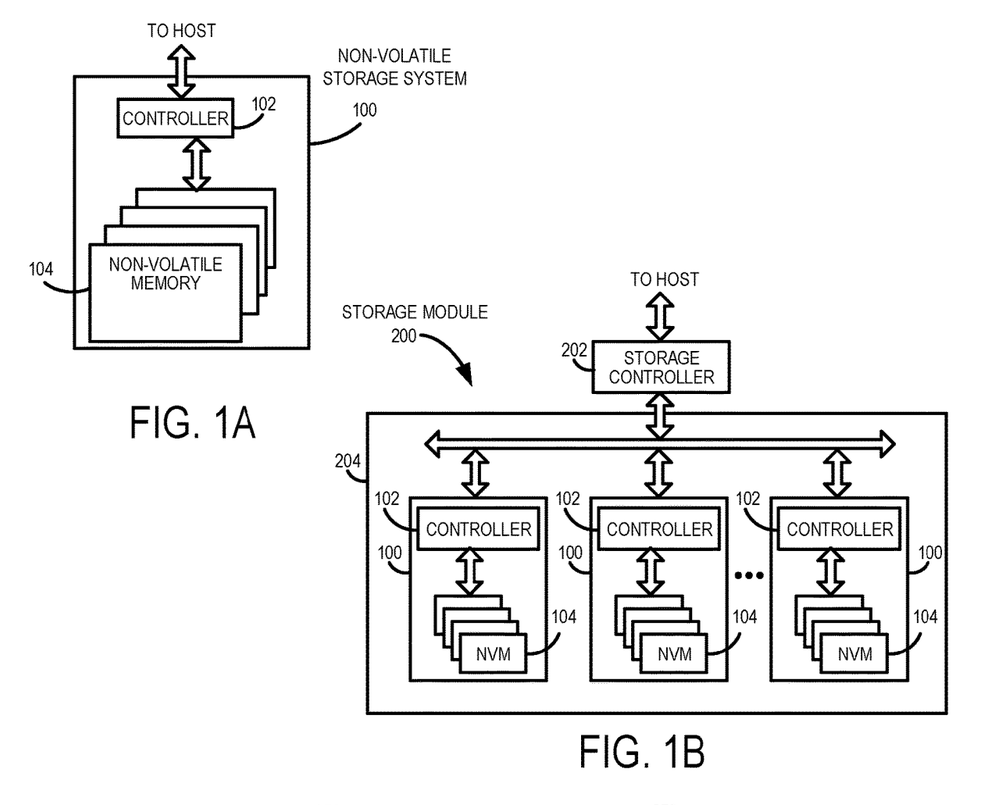
FIG. 1A is a block diagram of a data storage device of an embodiment.
FIG. 1B is a block diagram illustrating a storage module of an embodiment.
Figure 1C:
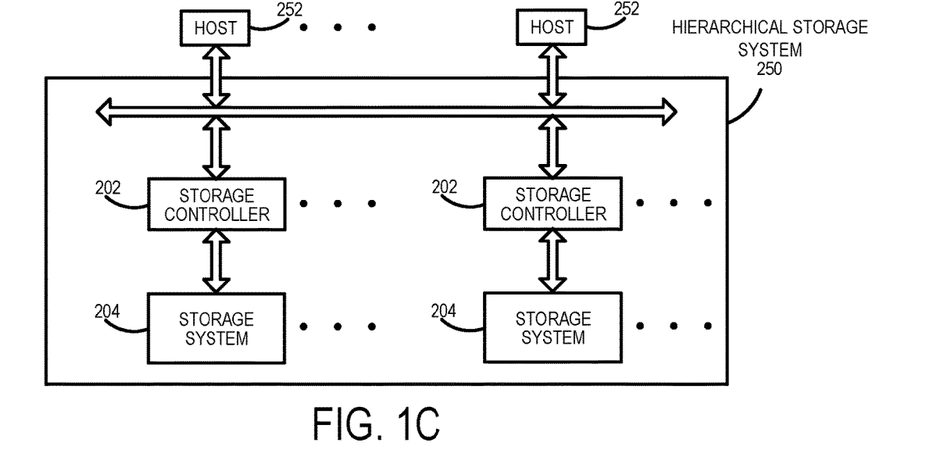
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
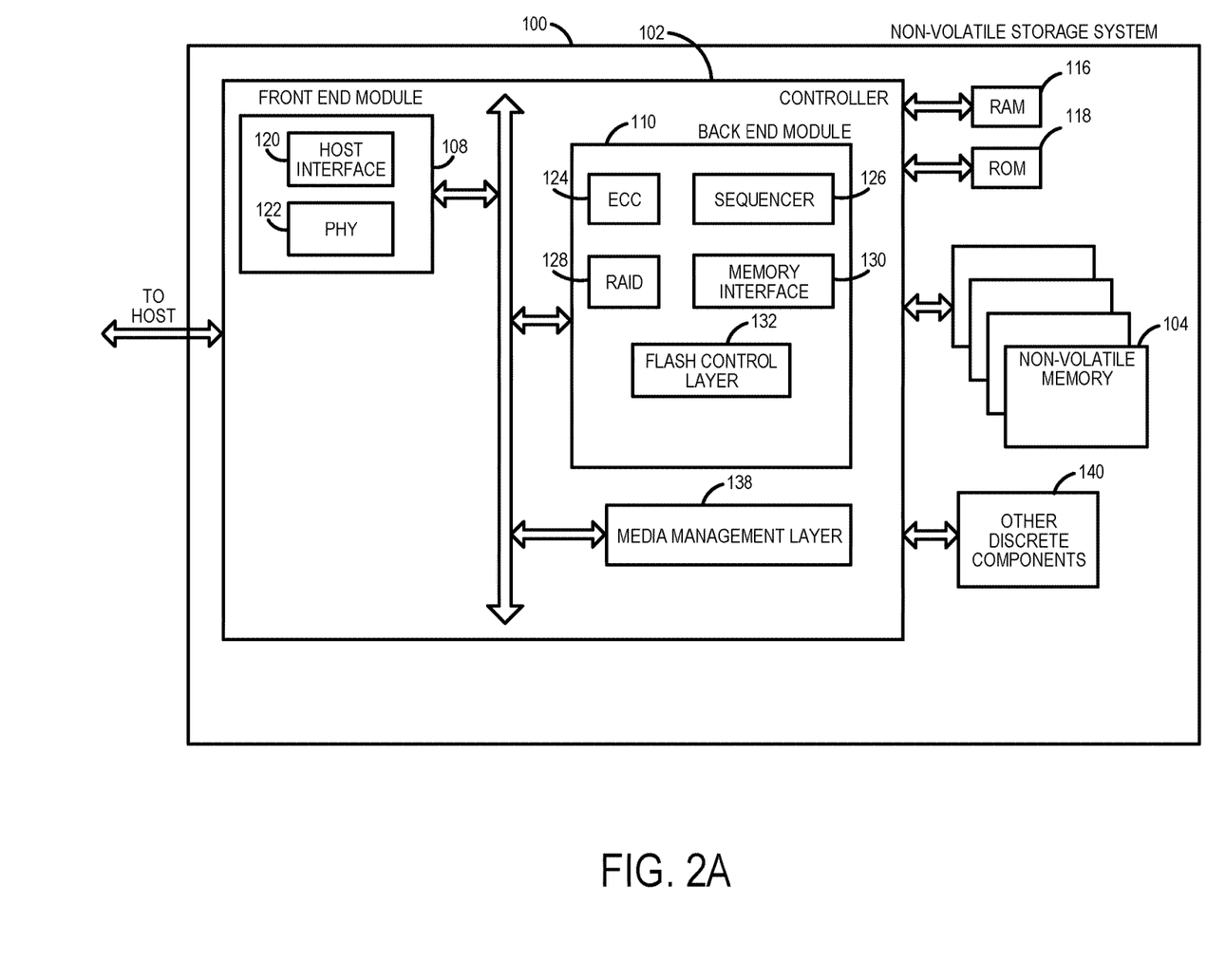
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 444 are optional components that are not necessary in the controller 102.

Figure 2B:
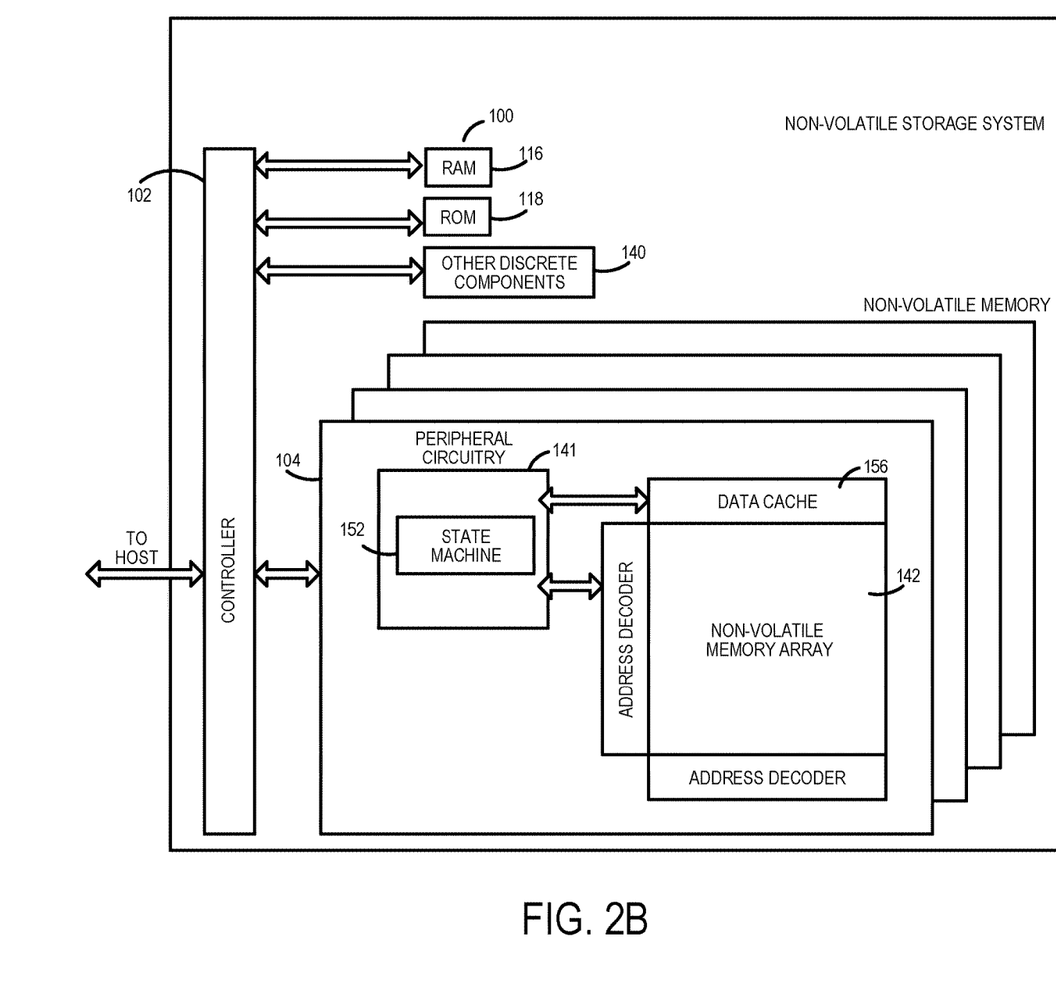
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
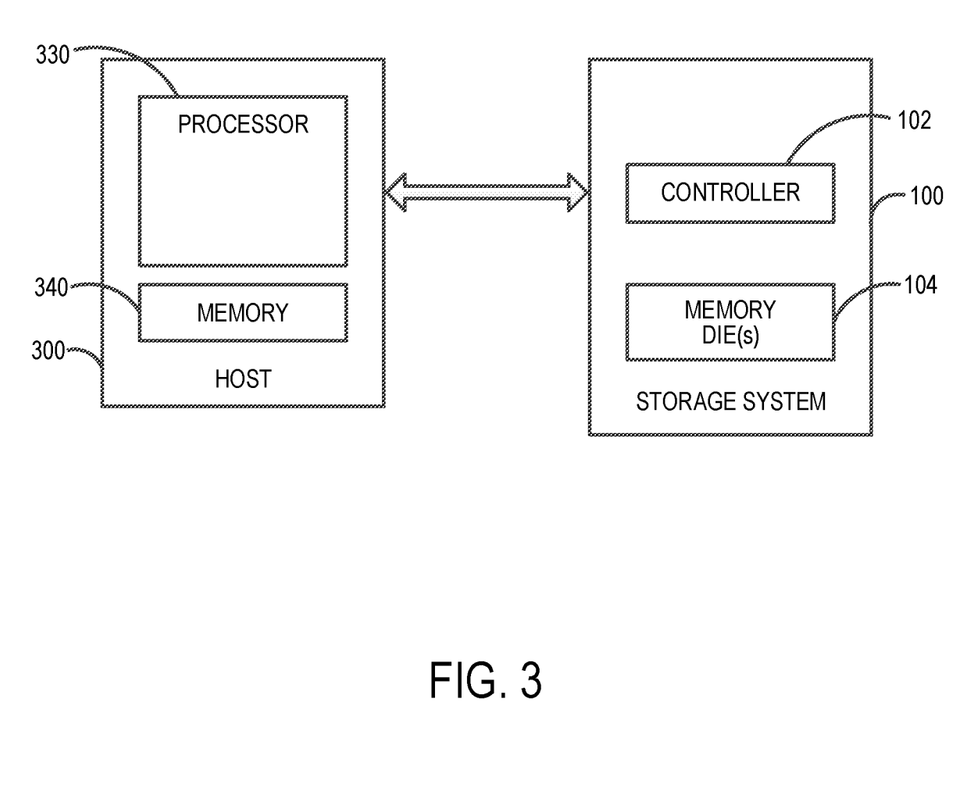
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, many protocols are available under which a host and a data storage device can exchange data. These protocols typically involve data transfer on more than one physical lane and in different speed configurations. For example, the Universal Serial Bus (USB) 3.2 GEN 2×2 protocol can support speeds as high as 20 gigabits per second (Gbps) and as low as 12 megabits per second (Mbps) and 1.5 Mbps. 20 Gbps can be achieved using two physical lanes running at a clock frequency of 312.5 megahertz (MHz). In cases where the host is requesting continuous data transfers, the data storage device can heat up to a problematic temperature where data gets corrupted or a particular block becomes unresponsive to different voltage signals and needs to be retired as a bad block, which reduces overall capacity of the memory. Data storage devices can apply proactive measures to attempt to prevent these problems. For example, the data storage device can slow down the operating clock of its controller and memory, so that the temperature can be regulated to the point where data integrity can be maintained. More specifically, reducing the clock frequency throttles an amount of data being processed by the memory, which, in turn, limits the amount of generated heat, so that ambient temperature can be achieved.

Figure 8:
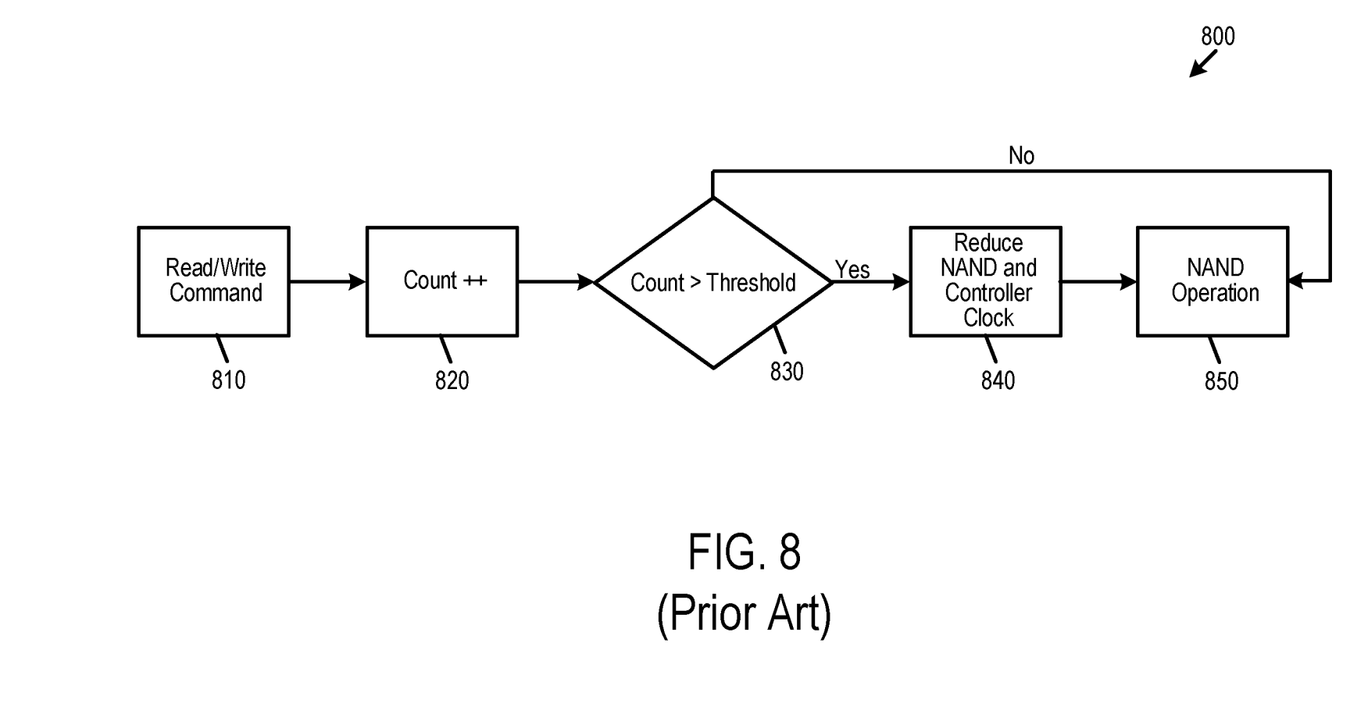
FIG. 8 is a flow chart of a prior art method for reducing a frequency of controller and memory clocks to control temperature in a data storage device.

If a data storage device does not have a built-in heat/temperature sensor, the data storage device may not be able to perform an accurate analysis regarding when to reduce or increase clock frequency. In such cases, the data storage device can keep track of number of commands and data input-output operations received for a data transfer. Once the count reaches a defined threshold, the controller and memory clock can be reduced to run at a lower frequency to lower heat generation and control temperature. After a fixed time interval, the controller and memory clocks can be increased to run at the maximum frequency, and the count is reset. This is illustrated in the flow chart 800 in FIG. 8. As shown in FIG. 8, in response to a read/write command (act 810), a count is increased (act 820). A determination is then made about whether the count is above a threshold (act 830). If the count is above the threshold, the frequency of the NAND and controller clock is reduced (act 840), and the NAND operation is performed (act 850). If the count is not above the threshold, the NAND operation is performed (act 850) without reducing the frequency of the NAND and controller clock.

One disadvantage to these approaches is that reduction of clock frequency can lead to a throughput impact on the host side since the lanes are still active but not working to their fullest extent due to backend throttling. The following embodiments can be used to address this issue. In one embodiment, instead of or in addition to the clock reduction techniques discussed above, the controller 102 of the data storage device 100 communicates to the host 300 to reduce the throughput at the host level by reconfiguring the number of lanes. As used herein, a lane (or channel) refers to a physical connection (e.g., wire(s), signal trace(s)) used as a communication mechanism between the host 300 and the data storage device 100. Using some number of lanes fewer than the maximum number of lanes will automatically reduce the load on the data storage device 100, as now it has to handle fewer commands per second or fewer input-output operations corresponding to the reduced lane count. The controller 102 can make this request based on its thermal conditions, and the host 300 can re-enumerate the lanes based on that request. Moving to fewer lanes during backend throttling results in lower power consumption through savings from lane standby power, thereby directly affecting the thermal state. A backward-compatible physical interface can operate at a lower operating speed, which reduces the power consumption of the physical layer interface (PHY) 122. When the number of lanes is reduced, the disabled PHY circuit can be completely turned off, which reduces the PHY power significantly. This can help minimize underutilization and may be a preferred alternative to switching the lanes off.

In another embodiment, the host 300 determines to reset the data storage device 100 and re-enumerates with fewer lanes (e.g., ×1, ×2) based on an application requirement and workload necessity (one or both of which may be referred to as "workload" herein), so as to make sure that the data storage device's thermal and power conditions are optimal, rather than depending on the data storage device feedback. So, the decision to reduce the number of lanes used can be made by the data storage device 100 or the host. In yet another embodiment, the data storage device 100 (or host 300) proposes a reduction in the number of lanes, and the host 300 (or data storage device 100) decides whether or not to accept the proposal.

Figure 4:
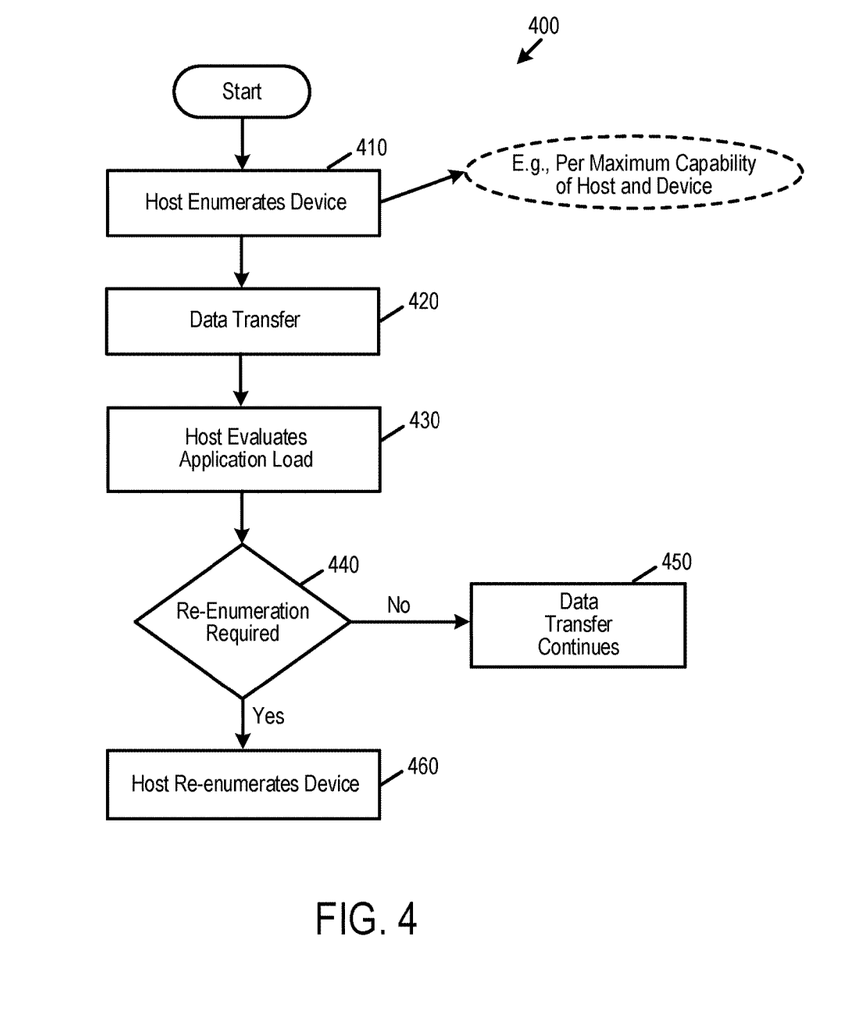
FIG. 4 is a flow chart of a re-enumeration method of an embodiment.
Figure 5:
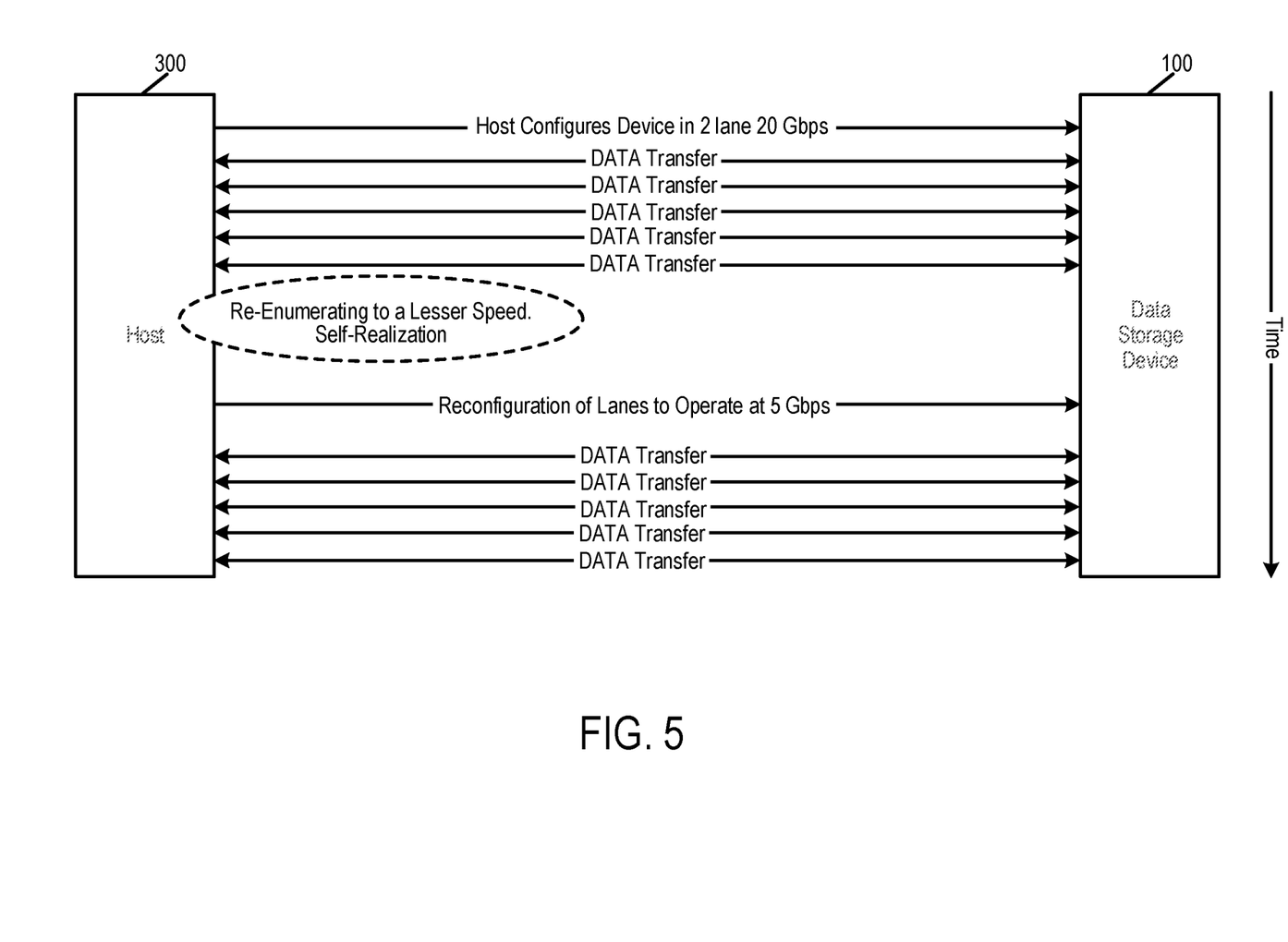
FIG. 5 is a diagram illustrating data transfer and re-enumeration of an embodiment.

Turning again to the drawings, FIG. 4 is a flow chart 400 of a process of data storage device re-enumeration by the host 300. Enumeration is the process of detecting and identifying the data storage device 100 and establishing the number of lanes used in the bus between the host 300 and the data storage device 100. As shown in FIG. 4, in this embodiment, the host 300 initially enumerates the data storage device 100 as per the maximum capacity of the host 300 and the data storage device 100, resulting in the maximum number of lanes being used (act 410). (In other embodiments, the initial number is some number less than the maximum number of lanes.) After data transfer (act 420), the host 300 evaluates the application load (act 430) and determines if re-enumeration is required (act 440). If re-enumeration is not required, the data transfer continues (act 450). However, if re-enumeration is required, the host 300 re-enumerates the data storage device 100, so that fewer lanes are used (act 460). This is illustrated in FIG. 5. As shown at the top part of FIG. 5, initially, the host 300 configures two lanes at an operating speed of 20 Gbps for communication with the data storage device 100. The host 300 later realizes that a lower speed is appropriate and reconfigures the lanes to operate at a speed of 4 Gbps.

Figure 6:
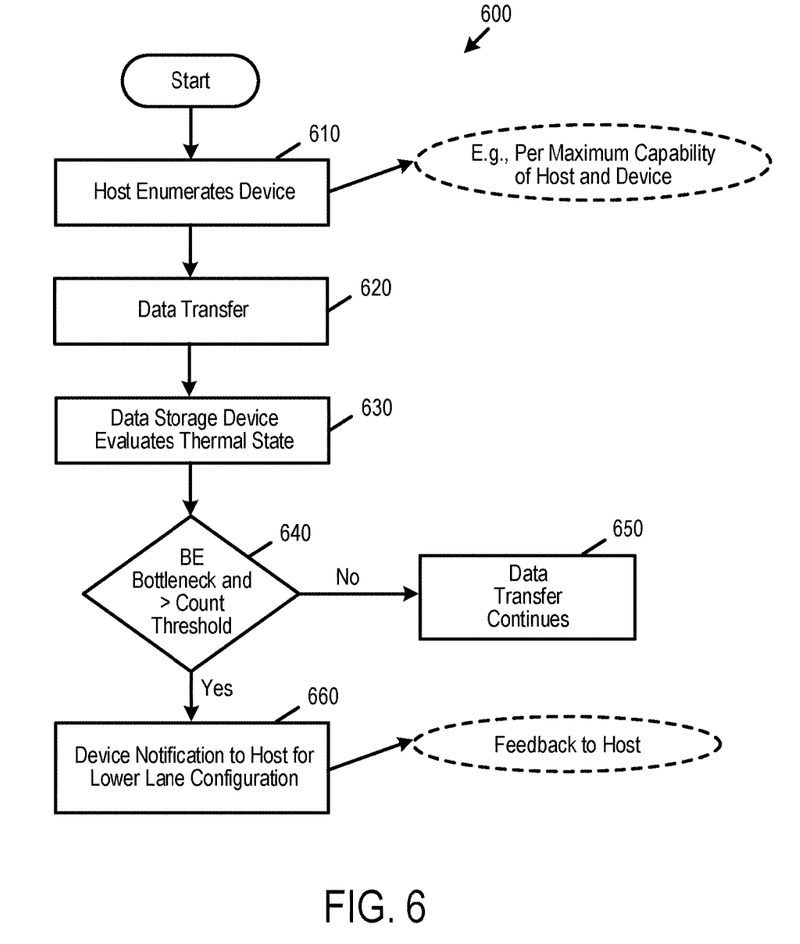
FIG. 6 is a flow chart of a device intimation method of an embodiment.
Figure 7:
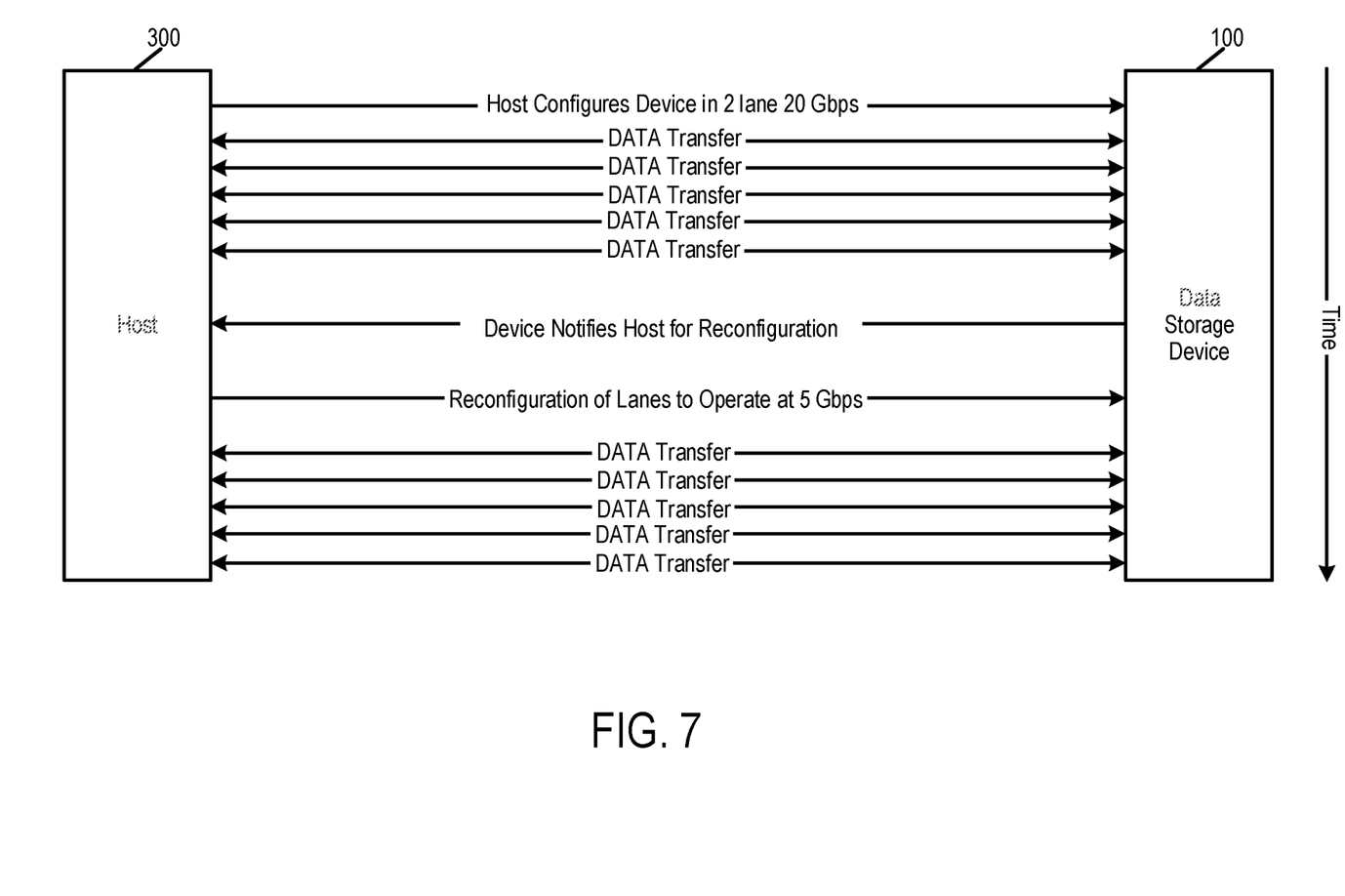
FIG. 7 is a diagram illustrating a data transfer and a reconfiguration sequence of an embodiment.

In another embodiment, the controller 102 of the data storage device 100 sends feedback on lane reduction in response to determining that the backend is not the bottleneck owing to thermal protection. This mechanism avoids explicit throttling at the backend and is illustrated in the flowchart 600 in FIG. 6. As shown in FIG. 6, the host 300 enumerates the data storage device 100 with the maximum number (or some other number) of lanes (act 610). After data transfer (act 620), the controller 102 of the data storage device 100 evaluates the thermal state of the data storage device 100 (act 630). For example, the controller 102 can be provided with a temperature of a temperature sensor of the data storage device 100, or the controller 102 can determine if there is a backend (BE) bottleneck and if a count of a number of commands and data input-output operations received for a data transfer is above a threshold (act 640). If that determination is in the negative, the data transfer continues (act 650). However, if that determination is in the affirmative, the controller 102 sends a notification/feedback to the host 300 to prompt the host 300 to provide a lower lane configuration, which will reduce the temperature of the data storage device (act 660). The is illustrated in FIG. 7. As shown at the top part of FIG. 7, initially, the host 300 configures the two lanes at an operating speed of 20 Gbps to communicate with the data storage device 100. Later, the controller 102 notifies the host 300 that a lane reconfiguration is desired. In response, the host 300 reconfigures the lanes to operate at 5 Gbps.

As noted above, the host 300 may, not does not have to, initially start with the maximum number of lanes. The number of lanes enumerated can be any suitable number and can, for example, be based on an application requirement or a device state machine. For example, there can be an advantage in setting up two lanes rather than four lanes for the same backend input-output (IO) (throttled or non-throttled IO given the device state machine). When the data storage device 100 runs at a low data rate but in a full lane mode (four in this example), all the lanes may be underutilized. There may not be a loss of performance due to this lane reduction since the backend is the bottleneck in this example.

As also noted above, in one embodiment, the controller 102 monitors the number of data commands received per second to calculate the throughput (using any suitable mechanism) in a moving window. The controller 102 can renegotiate the speed and reconfigure the lanes to a lower number of lanes to have good thermal impact. However, frequent re-enumeration may be undesirable. Accordingly, the controller 102 can use a threshold over time to determine whether a hint should be sent to the host 300. The host 300 may have a similar threshold for reconfiguration for different applications. Also, while the controller 102 can provide hints at any suitable time, the host 300 can be in control of whether or not a hint is acted upon, which can make the data storage device 100 backwards compatible.

Once a throughput value is reached, the controller 102 can notify the host 300 via a feedback mechanism to reconfigure the data storage device 100 in a lower speed or a lower lane configuration. This can result in low data handling on the data storage device side, thus maintaining the overall temperature. The feedback mechanism used can vary by protocol. The following paragraphs provide an example pertaining to the USB protocol, but it should be understood that other protocols can be used, including, but not limited to, SATA and NVMe.

In the USB protocol, the data storage device 100 can intimate to the host 300 to inquire about the throughput status using a vendor-specific command, so the host 300 can decide whether it should re configure/renegotiate the data storage device 100 in a lower speed. In one example, a USB data storage device supports a minimum of five endpoints: two control endpoints, two data transfer endpoints, and one interrupt endpoint. The USB can make use of a human interface device (HID) interface to report what identifiers (IDs) it supports, one of which can have information related to throughput.

Once the host 300 intercepts a particular report ID on an interrupt endpoint, it can issue a Small Computer System Interface (SCSI) vendor command to get throughput information from the data storage device 100. Based on this information, it can decide if the data storage device 100 can be re-configured to a lower speed. The reset or re-enumeration of the data storage device 100 can cause the data storage device 100 to reset the entire drive. An option of reconfiguration of lanes and renegotiation of speed can be achieved by changing the link state of the drive from active to inactive, and the wake up of the link state can be transitioned to reconfigure lane and renegotiate the speed, which can ensure that the data storage device 100 is not completely reset and only the PHY configuration is updated.

There are several advantages associated with these embodiments. For example, these embodiments can be used to provide better data handling and ensure that there is no data corruption, as well as provide better power management. These embodiments can also be used in small form-factor devices, such as SD-Express, since not using some PCIe lanes allows the device relief from thermal effects.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
   a memory; and
   a controller configured to:
      determine that action is needed to control a thermal state of the data storage device in response to a number of commands for processing by the data storage device exceeding a threshold; and
      in response to determining that action is needed to control the thermal state of the data storage device, send a request to a host to reduce a number of lanes the host uses to communicate with the data storage device, wherein reducing the number of lanes reduces an amount of heat generated by the data storage device.

2. The data storage device of claim 1, wherein the controller is further configured to determine that action is needed to control the thermal state of the data storage device in response to reading a temperature from a temperature sensor in the data storage device.

3. The data storage device of claim 1, wherein the controller is further configured to determine that action is needed to control the thermal state of the data storage device in response to the number of commands for processing by the data storage device exceeding the threshold over a period of time.

4. The data storage device of claim 1, wherein the controller is further configured to reduce a frequency of a clock in the data storage device to reduce an amount of heat generated by the data storage device.

5. The data storage device of claim 1, wherein the controller is further configured to disable a physical layer interface coupled with lane(s) that are no longer used after the number of lanes has been reduced.

6. The data storage device of claim 1, wherein the request is for a reduction of the number of lanes from a maximum number of available lanes.

7. The data storage device of claim 1, wherein the request is sent instead of throttling a backend of the controller.

8. The data storage device of claim 1, wherein the request is a proposal that is optionally acceptable by the host.

9. The data storage device of claim 1, wherein the request is a command that is a requirement for the host.

10. The data storage device of claim 1, wherein the controller is further configured to send the request to the host via a vendor-specific command.

11. The data storage device of claim 1, wherein the memory comprises a three-dimensional memory.

12. A method comprising:
performing the following in a host in communication with a data storage device:
enumerating the data storage device with a first number of lanes;
evaluating a workload to be sent to the data storage device for a thermal impact on the data storage device, wherein evaluating the workload to be sent to the data storage device comprises determining whether a number of commands in the workload exceeds a threshold; and
re-enumerating the data storage device with a second, reduced number of lanes to control the thermal impact on the data storage device.

13. The method of claim 12, wherein the first number of lanes comprises a maximum available number of lanes.

14. The method of claim 12, wherein evaluating the workload to be sent to the data storage device comprises determining whether the number of commands to be sent to the data storage device exceeds the threshold over a period of time.

15. The method of claim 12, further comprising receiving a request from the data storage device to re-enumerate the data storage device.

16. The method of claim 15, further comprising determining whether to grant the request.

17. The method of claim 15, wherein the request is received via a vendor-specific command.

18. A data storage device comprising:
a memory; and
means for:
determining that action is needed to control a thermal state of the data storage device in response to a number of commands for processing by the data storage device exceeding a threshold; and
sending a request to a host to reduce a number of lanes the host uses to communicate with the data storage device in response to determining that action is needed to control the thermal state of the data storage device, wherein reducing the number of lanes reduces an amount of heat generated by the data storage device.

* * * * *